US005135197A

United States Patent [19]

Kelley et al.

[11] Patent Number: 5,135,197

[45] Date of Patent: Aug. 4, 1992

[54] EQUIPMENT SECURITY METHOD AND APPARATUS

[75] Inventors: Donald W. Kelley, Fremont; Roy E. Long, San Jose, both of Calif.

[73] Assignee: Qualtec Data Products, Inc., Fremont, Calif.

[21] Appl. No.: 575,444

[22] Filed: Aug. 30, 1990

[51] Int. Cl.⁵ .......... F16M 13/00

[52] U.S. Cl. .......... 248/551; 70/58; 248/505; 248/918

[58] Field of Search .......... 248/551, 552, 553, 176, 248/670, 675, 676, 918, 505; 70/58, 62

[56] References Cited

U.S. PATENT DOCUMENTS

| | | | |
|---|---|---|---|
| 3,664,616 | 5/1972 | Raskin . | |
| 3,731,760 | 5/1973 | Hammes | 248/553 X |
| 3,850,392 | 11/1974 | Gassaway . | |
| 4,065,083 | 12/1977 | Gassaway . | |
| 4,079,604 | 3/1978 | Anderegg | 70/58 |
| 4,294,088 | 10/1981 | Barr | 70/58 X |
| 4,474,116 | 10/1984 | Castenada, Jr. et al. | 248/551 X |
| 4,577,563 | 3/1986 | Sidler | 248/553 X |
| 4,585,202 | 4/1986 | Parsekian | 248/553 |
| 4,613,109 | 9/1986 | Boscacci . | |
| 4,624,510 | 11/1986 | Jedziniak . | |
| 4,655,429 | 4/1987 | Gaenzle et al. | 248/553 |
| 4,712,763 | 12/1987 | Leite | 248/553 |
| 4,739,637 | 4/1988 | Finkel et al. | 248/553 X |
| 4,858,878 | 8/1989 | Gassaway | 248/551 |
| 4,884,420 | 12/1989 | Finkel et al. | 248/551 X |

FOREIGN PATENT DOCUMENTS

| | | | |
|---|---|---|---|
| 2134587 | 8/1984 | United Kingdom | 70/58 |
| 2153002 | 8/1985 | United Kingdom | 70/58 |

OTHER PUBLICATIONS

Data sheet-Security Pads for a Wide Variety of Office Equipment; Compu-Gard Boscop Inc., Canton, MA.

Data sheet -Padolock Security System: Doss Industries, San Francisco, CA (3 pages).

*Primary Examiner*—David L. Talbott

*Attorney, Agent, or Firm*—Fliesler, Dubb, Meyer & Lovejoy

[57] ABSTRACT

An equipment security apparatus comprising a base member and a cover member. The base member is attached to vertical or horizontal surfaces by means of bolts or adhesive pads and plates or brackets as required in a particular installation. The cover member is removably attached to the base member by inserting a pair of inwardly directed pin members which extend from the cover member into holes provided therefor in the base member and locking the cover member to othe base member. Equipment is securely attached to the cover member by means of one or more U-shaped rod members or straps which are made from case-hardened steel so as to prevent their being readily cut or severed by manual cutting apparatus such as bolt-cutters or the like.

29 Claims, 10 Drawing Sheets

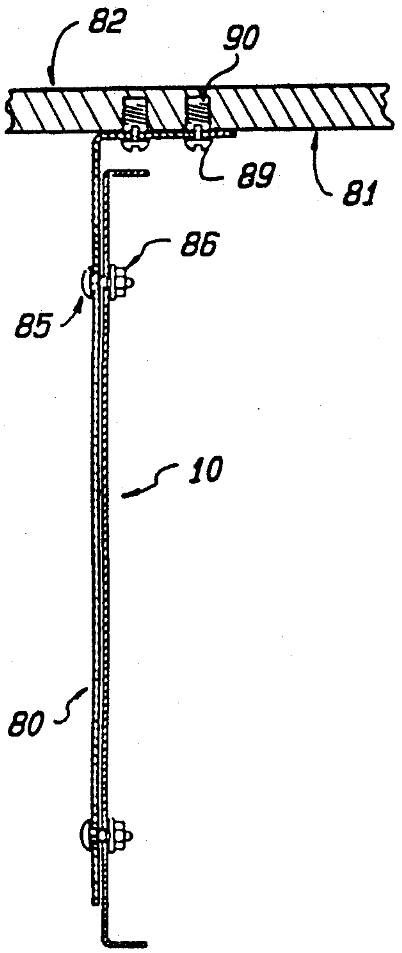
FIG. 19
FIG. 20B
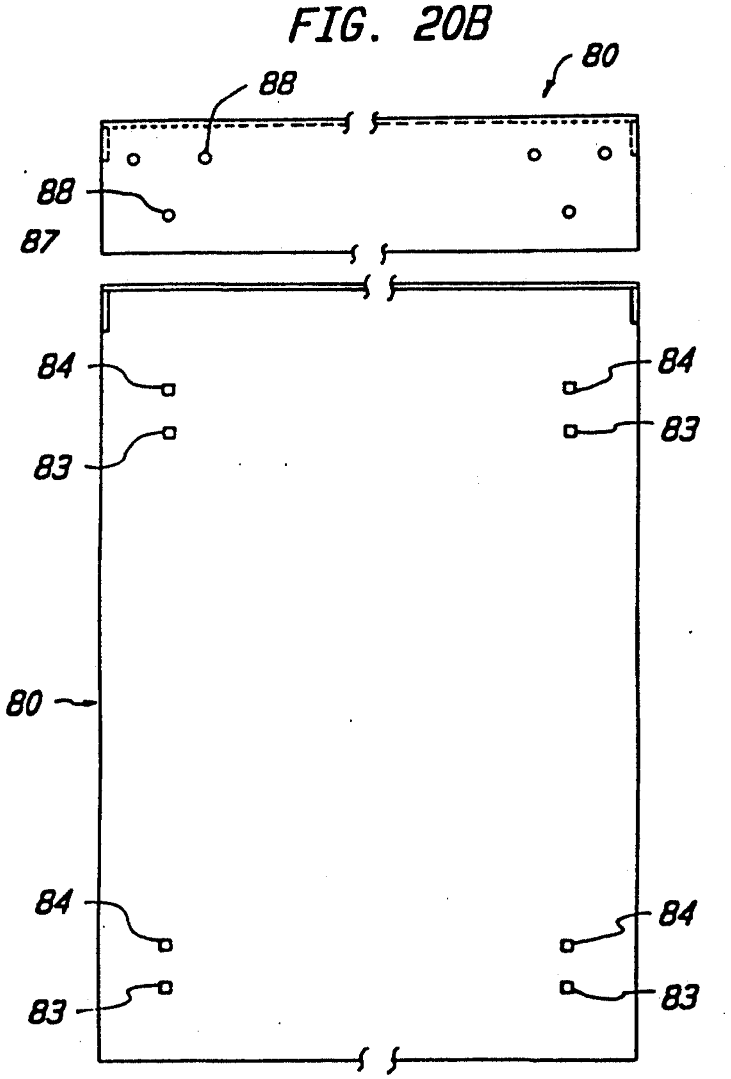
FIG. 20A

EQUIPMENT SECURITY METHOD AND APPARATUS

BACKGROUND OF THE INVENTION

1. Field of the Invention

The present invention relates to equipment security apparatus in general and in particular to a method and apparatus for releasably attaching equipment, such as computers, typewriters, printers, facsimile machines and the like to horizontal and vertical surfaces.

2. Description of the Prior Art

The theft of and tampering with office equipment, such as computer equipment, typewriters, printers, facsimile machines and the like from offices, schools and other workplaces has given rise to a number of methods and a variety of apparatus for releasably securing the equipment to horizontal and vertical surfaces. Such surfaces may, for example, comprise a table top, a desk top, the side panel of a desk or cabinet, a wall surface, and the like.

Whatever else the security apparatus used to secure equipment from theft and tampering comprises, it is important that the apparatus readily permit the authorized removal of the equipment for repair and/or replacement. It is also important that the security apparatus used be unobtrusive and that it not interfere with the proper operation of the equipment or the operator thereof.

The type of security apparatus to which the present invention relates comprises a base member and a cover member.

The base member is attached to a horizontal or vertical surface by means of bolts or adhesive pads or strips in such a manner that unauthorized removal thereof is rendered very difficult, if at all possible, without significant damage to the base member and/or surface to which it is attached.

Heretofore, when bolts or the like were used for attaching the base member to a horizontal or vertical surface, the base member was generally customized for a particular type and size of equipment and the attaching method and means used did not normally provide for replacing the equipment so attached with equipment of a different size or shape. Thus, when equipment of a different size and/or shape was secured at the same location, it was often necessary to place new holes in the mounting surface in order to mount the equipment. Such procedures were costly in both time and money and often left unused holes in the mounting surface which had to be repaired.

The cover member is attached to the base member by means including a key operable lock which allows the cover member to be removed from the base member when the lock is opened.

Heretofore, the means used for attaching the cover member to the base member has typically comprised relative costly and complex sheet metal bending, castings, movable mechanisms and the like. For example, in one arrangement, the base member comprises one or more plates comprising parallel sets of colinear loops which mate with corresponding colinear loops extends from a cast metallic cover member. A plurality of rods are inserted through the loops for joining the cover member to the base member and held in place by a lock. Such an arrangement is shown, for example, in Gassaway, U.S. Pat. No. 3,850,392.

In another prior known arrangement, the means used for attaching the cover and base members together comprises a mechanism with four radially extending arms/rods which are manipulated in such a manner as to pass through mating holes in the cover and base members for locking the two together. An example of this type of arrangement has been sold by Doss Industries, San Francisco, Calif.

Still other examples of the means which have been used in the past to releasably join a cover member to a base member are represented by cover and base members which have overlapping and flanged sidewalls which are engaged in a telescoping manner. An example of this type of arrangement has been sold by Boscop Inc., Canton, Mass. and another is disclosed in Boscacci U.S. Pat. No. 4,613,109.

Other important features of a security apparatus of the type to which the present invention relates pertain to the method and means used for attaching or otherwise securing the equipment to the cover member. For example, in many such arrangements, the equipment is bolted to the cover member by means of retaining bolts which project upwardly through holes provided therefore in the cover member. While possibly the simplest, this method cannot be used in those cases in which the equipment does not include secure anchoring points, such as for example, personal computers, keyboards, and the like, which comprise plastic housings. Another disadvantage of this method is that there is generally sufficient clearance between the equipment and the cover member for one to insert a hacksaw blade or the like and cut through the retaining bolts.

Another method which has been used for securing equipment to a cover member comprises enclosing the equipment in a housing attached to the cover member. While considerably more secure than simply bolting the equipment to a cover member as described above, this method has the disadvantage of being costly in terms of labor and materials required for fabricating the housing and, possibly even more importantly, it has the disadvantage of requiring either cooling equipment or other some other means for providing adequate ventilation for the equipment installed therein. Moreover, such housings are often bulky, taking up valuable space and are relatively obtrusive. An example of such a housing is shown in Jedziniak U.S. Pat. No. 4,624,510.

SUMMARY OF THE INVENTION

In view of the foregoing, principal objects of the present invention comprise a novel method and apparatus including a base and cover member for releasably securing equipment to a horizontal or vertical surface such as, for example, the upper or under surface of a desk or table, the side panel of a desk, or a wall.

The base and cover members are relatively inexpensive to manufacture and can be used with mounting bolts and optional brackets to mount equipment of differing types and sizes to the same location on a horizontal or vertical surface without the need for providing addition mounting holes therein. A pair of U-shaped rod members are provided for securing the equipment to the cover member and the cover member is provided with a relatively pick-proof lock. The lock, in conjunction with a pair of stud members which extend inwardly from a sidewall of the cover member for engaging holes provided therefor in the base member, releasably secures the cover member to the base member.

In alternative embodiments of the present invention, adhesive pads are used for securing the base member to a horizontal surface and adhesive pads and/or brackets comprising vent hole engaging fingers are used for securing the equipment to the cover member.

BRIEF DESCRIPTION OF THE DRAWINGS

The above and other objects, features and advantages of the present invention will become apparent from the following detailed description of the accompanying drawings, in which:

FIG. 19 is a cross-sectional view of an L-shaped bracket according to the present invention which is used for mounting the base, plate to the undersurface of a desk or table top;

FIGS. 20A and 20B are elevation and top plan views of the L-shaped brackets of FIG. 19;

DETAILED DESCRIPTION OF THE DRAWINGS

Figure 1:
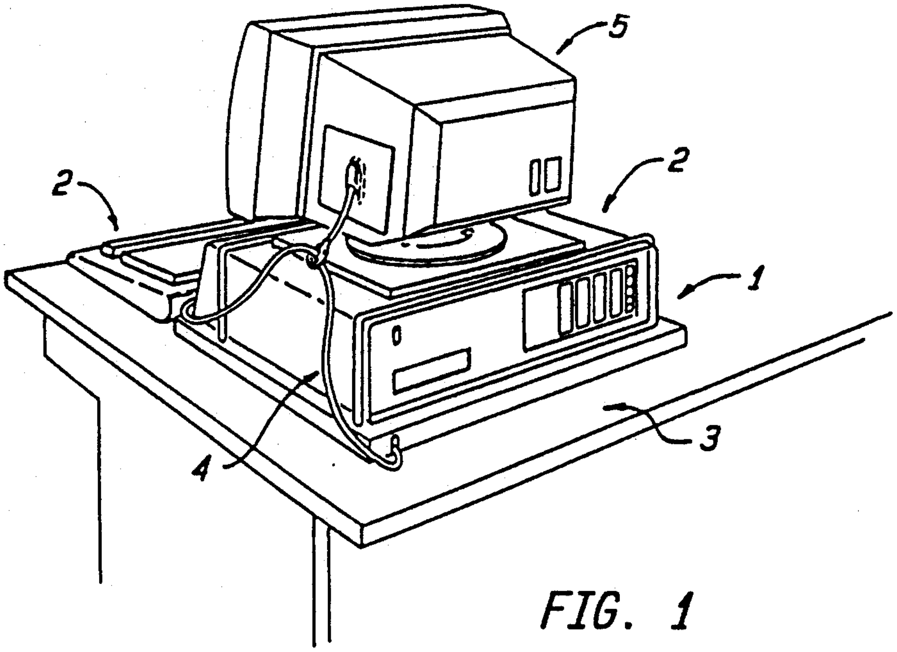
FIG. 1 is a perspective view of a computer central processing unit, monitor and keyboard mounted to a table top using a cover and base member assembly according to the present invention.

Referring to FIG. 1, there is provided in accordance with the present invention an equipment security apparatus designated generally as 1. The apparatus 1 is provided for securely mounting a computer central processing unit 2 or other equipment to a horizontal surface 3, such as that provided by a table or desk. A cable assembly 4 which is connected to the apparatus 1 is used for coupling a monitor 5 and a keyboard 6 or other additional equipment to the apparatus 1 as will be further described below.

Figure 2:
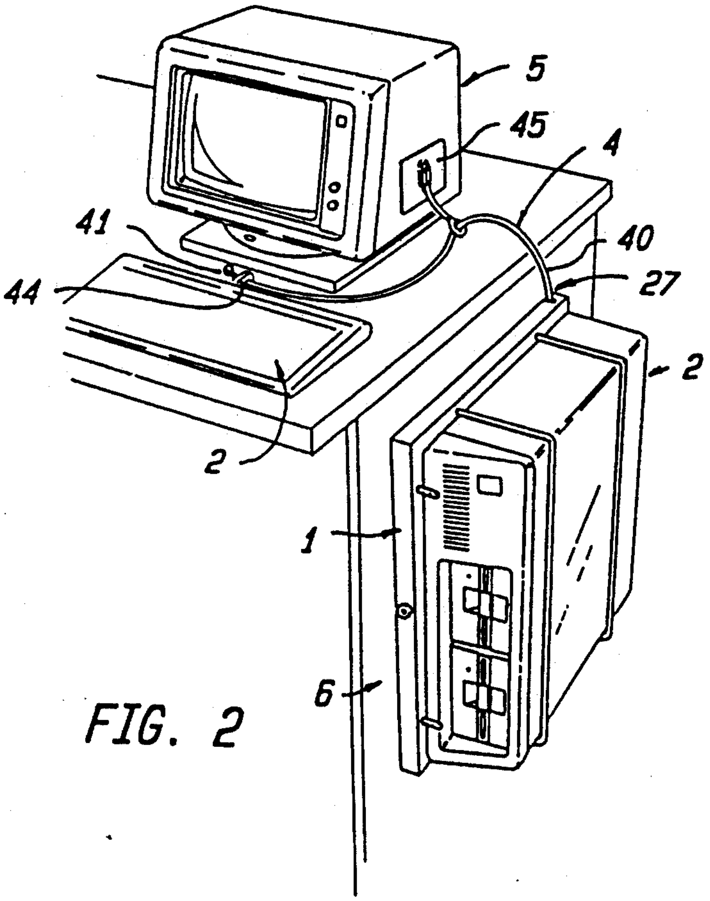
FIG. 2 is a perspective view of a computer central processing unit mounted to the side panel of a desk using the cover and base member assembly of FIG. 1.

Referring to FIG. 2, the apparatus 1 is shown being used for mounting the computer central processing unit 2 or other equipment to a vertical surface 6 such as that provided by a wall or a desk panel. As in FIG. 1, the cable assembly 4 is shown coupling a monitor 5 and keyboard 2 to the apparatus 1.

Figure 3:
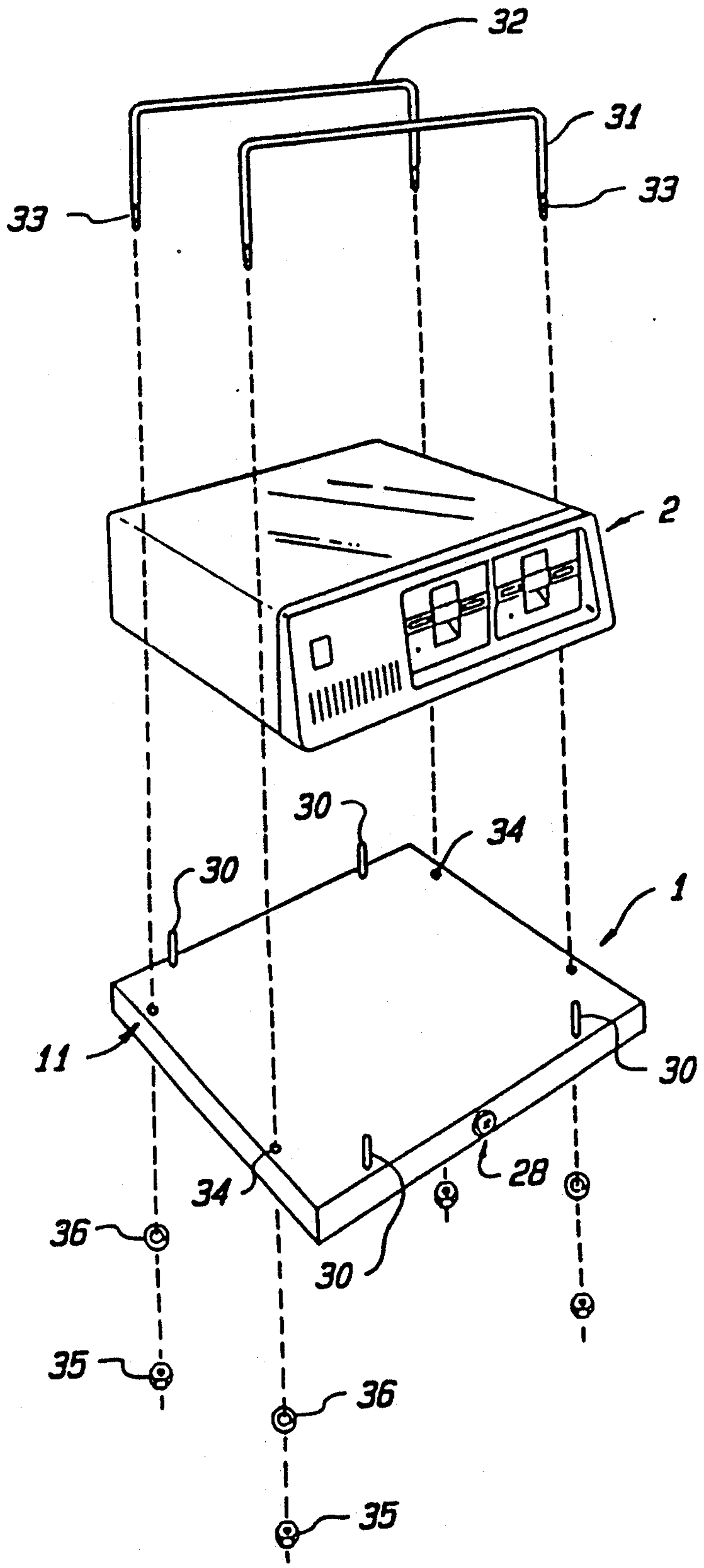
FIG. 3 is a partial exploded view of the cover and base member assembly according to the present invention.
Figure 4:
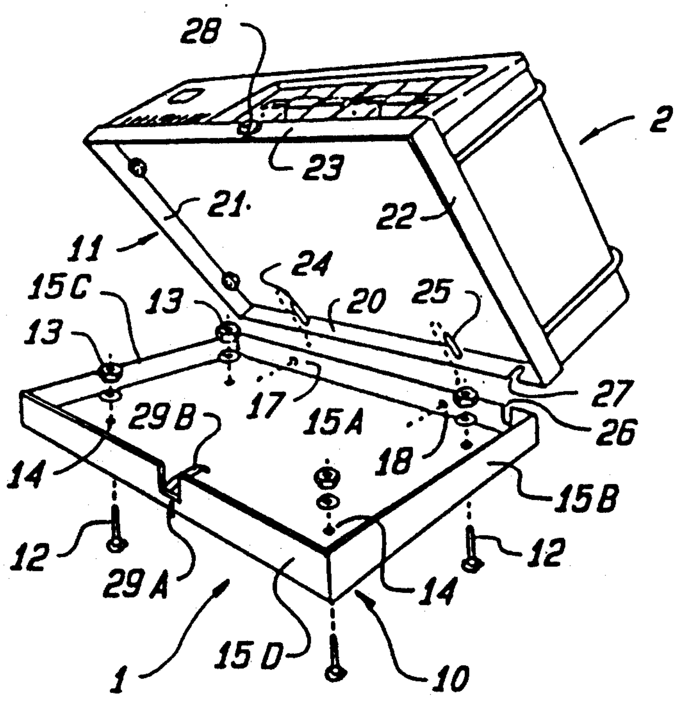
FIG. 4 is a view showing in more detail the cover and base member assembly of FIG. 3.

Referring to FIGS. 3 and 4, there is provided in the apparatus 1 a base member 10 and a cover member 11. Bolts 12, comprising smooth stove-bolt-type heads, nut members 13 and holes 14 are provided in the corners of the base member 10 for mounting the base member 10 to a horizontal or vertical surface such as the horizontal surface 3 and vertical surface 6 shown in FIGS. 1 and 2. To avoid the necessity of drilling additional holes in the mounting surface whenever there is a change in the size of the base member 10, the holes 14 in the base member 10, regardless of its size, are provided to be a predetermined distance apart, e.g. 12 inches. Of course, if a base member 10 in a set of base members is less than 12 inches on each side, the holes 14 in each base member in the set will have to be closer together or a smaller spacing used for the smaller base member.

In the base member 10 there is also provided an upwardly extending rear wall 15A, a pair of upwardly extending side walls 15B and 15C and an upwardly extending front wall 15D. Located in the rear wall 15A there is provided a pair of holes 17 and 18.

In the cover member 11 there is provided a downwardly directed rear wall 20, a pair of downwardly directed side walls 21 and 22 and a downwardly directed front wall 23. Extending inwardly from the rear wall 20 there is provided a pair of rod-like pin members 24 and 25. Also located in the rear wall members 15A and 20 of the base and cover members 10 and 11 there is provided a pair of slots 26 and 27, respectively. Slots 26 and 27 are provided to be in registration with each other when the cover member 11 is placed over the base member 10. Centrally located in the front wall 23 of the cover member 11 there is provided a pick-resistant lock assembly 28, such as a lock, P.N. 80W1251T-219-26-M726,KD, made by Medeco Security Lock Incorporated, Salem, Va. Centrally located behind a lock clearance cutout 29A in the upstanding front wall 15D of the base member 10 there is provided a lock engageable loop member 29B.

Extending upwardly from the exterior of the cover member 11 there is provided a plurality of rod-like pin members 30. The pin members 30 are located along the front and rear edges of the central processing unit 2 so as to prevent fore and aft movement of the central processing unit 2 relative to the cover member 11.

To attach the central processing unit 2 to the cover member 11 there is provided one or more U-shaped rod-like members, such as members 31 and 32. Members 31 and 32 are provided to closely fit over the top and extend down the sides of the central processing unit 2. A portion 33 of the lower ends of each of the members 31 and 32 is threaded and is provided for fitting through holes 34 provided therefor in the cover member 11. Nuts and washers 35 and 36 are provided for securely attaching the rod members 31 and 32 to the cover member 11.

Figure 5:
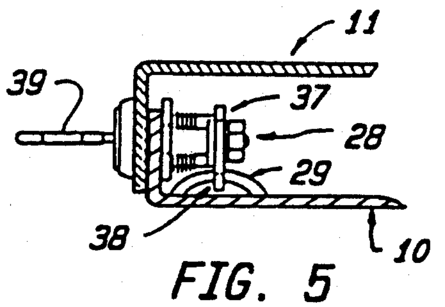
FIG. 5 is a side cross-sectional view of a locking mechanism according to the present invention.
Figure 6:
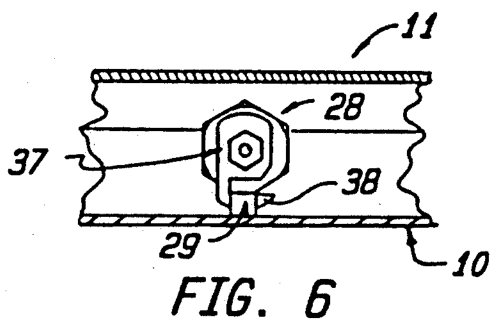
FIG. 6 is a rear view of FIG. 5.

As shown more clearly in FIGS. 5 and 6, the lock assembly 28 comprises a rotatable locking member 37 which has a finger 38 for engaging the loop member 29 when the finger 38 is rotated by means of a key 39 from an open position to a closed position.

In a preferred embodiment of the present invention the base member 10 and cover member 11 are made from sheets of steel approximately 0.059" thick. The rod members 31 and 32 comprise case-hardened steel and are approximately 0.375" in diameter. Alternatively, the rods 31 and 32 could be replaced by corresponding flat ribbon-like strap members (not shown) having threaded ends for mounting the strap members to the cover member 11. In either case, the members 31 and 32 conform closely to the size and shape of the central processing unit 2 or other equipment with which they are used so as to prevent ready access thereto by metal cutters.

Figure 7:
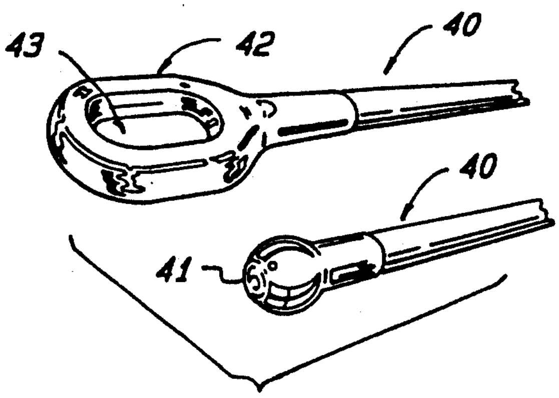
FIG. 7 is a partial view of the ends of a cable used for coupling additional equipment to the base and cover member assembly of the present invention.

Referring to FIG. 7, there is shown a fragmentary view of the ends of a cable 40 which is used in the cable assembly 4 described above with respect to FIGS. 1 and 2. The cable 40 comprises an enlarged spherical end fitting 41 and a generally rectangular fitting 42 having a generally rectangular hole 43 therein.

As seen more clearly in FIG. 2, the fitting 42 is passed through a fitting 44 on the rear of the keyboard 2. The cable 40 is then passed through a loop on the end of a cable assembly 45 attached to the monitor 5 and through the slots 26 and 27 in the base member 10 and cover member 11. When the base member 10 and cover member 11 are closed and locked together, the fitting 42 of the cable 40 is captured therein. The cable fittings 41 and 42 are designed to permit their use with other cables for coupling a variety of equipments together.

Figure 8:
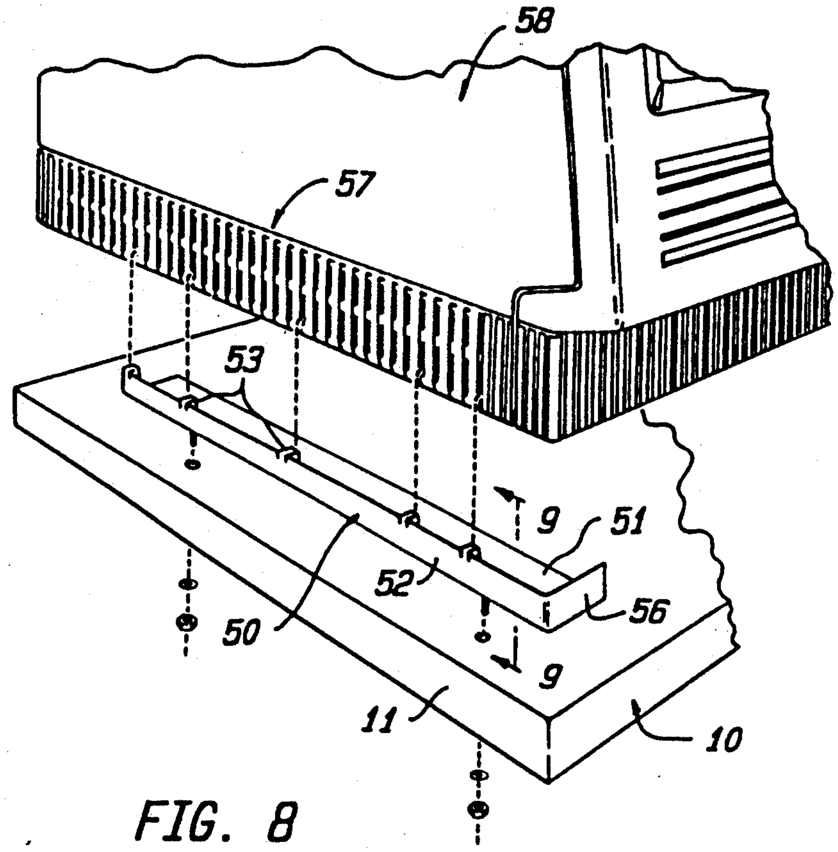
FIG. 8 is a perspective view of a mounting bracket according to the present invention.
Figure 9:
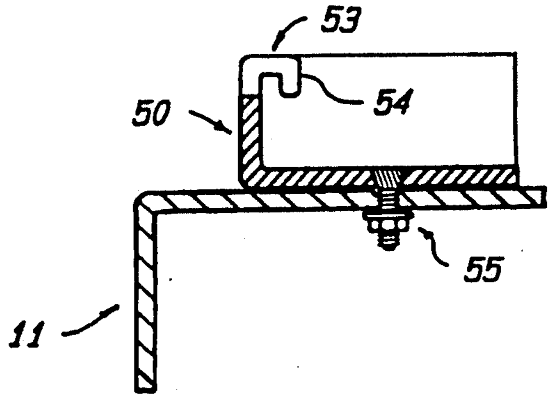
FIG. 9 is a cross-sectional view taken in the direction of lines 9—9 of the bracket of FIG. 8.

Referring to FIGS. 8 and 9, there is shown in another embodiment of the present invention an L-shaped bracket designated generally as 50. The bracket 50, having a horizontal portion 51 and an upstanding portion 52, is provided with a plurality of inwardly extending fingers 53 having a downwardly projecting portion 54 on the ends thereof. Fasteners 55, such as pemnut fasteners, are provided for fastening the bracket 50 to the cover member 10. An inwardly directed portion 56 which is affixed to the horizontal portion 51 provides rigidity to the upstanding portion 52.

In use, the bracket 50 is provided to engaging vent holes, or the like, designated generally as 57, in the sides of an equipment 58 to be attached to the cover member 10. While only one bracket 50 is shown in FIGS. 8 and 9, it is to be understood that a pair of brackets, one for each side of the equipment 58, is normally used in each installation.

Figure 10:
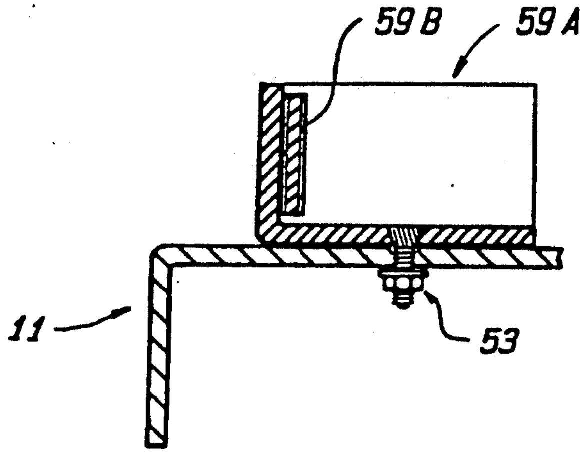
FIG. 10 is a cross-sectional view of an alternative mounting bracket according to the present invention.

Referring to FIG. 10, there is shown an L-shaped bracket 59A which may be used in place of the bracket 50 of FIGS. 8 and 9. In the bracket 59A there is provided an adhesive pad 59B which is used in place of the fingers 53 for adhesively attaching the equipment 58 to the bracket 59A. The material comprising the adhesive pad 59B comprises an open-cell foam carrier with adhesive on both sides which has a holding strength of approximately 80 psi. Such material can be purchased, for example, from Minnesota Mining & Manufacturing Co., Minneapolis, Minn.

Figure 11:
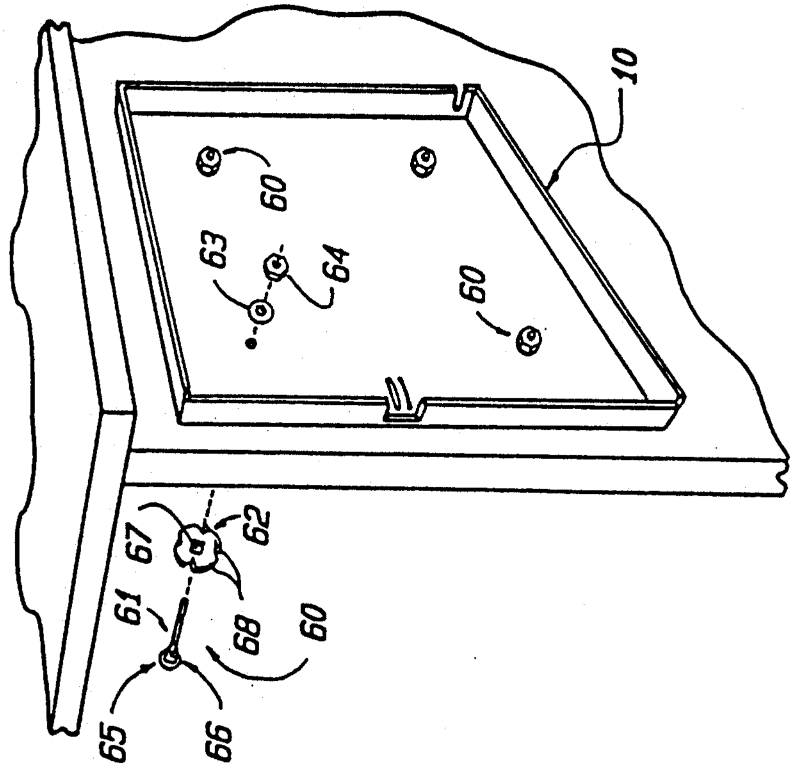
FIG. 11 is a view of the base member of the present invention mounted to a vertical surface.

Referring to FIG. 11, there is provided a plurality of fasteners 60. Each of the fasteners 60 comprises a bolt member 61, a grapper washer 62, a circular washer 63 and a nut 64. The bolt member 61 comprises a stove-bolt-type head 65. Extending inwardly from the head 65 there is provided a non-circular, typically square-shaped, shoulder 66. In the washer 62 there is provided a corresponding non-circular hole 67 and a plurality of teeth-like members 68 which extend from the washer 62 for engaging a wooden surface or the like to which the base member 10 is to be mounted. The washer 62 serves to prevent rotation of the bolt 61 when the nut 64 is threaded thereon.

Figure 12:
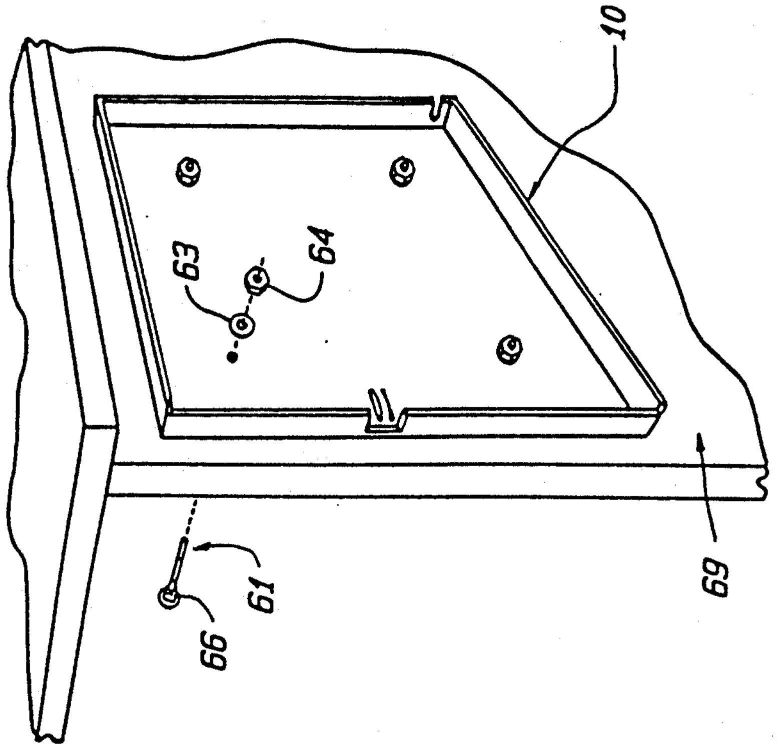
FIG. 12 is a view showing an alternative method for mounting the base member of the present invention to a vertical surface.

Referring to FIG. 12, the base member 10 is shown mounted to a vertical surface 69, e.g. the side panel of a metal desk, using the fastener 60 without the washer 62. In such applications, the hole provided in the panel for the bolt member 61 is sized so that the shoulder 66 will be drawn into the surface of the panel and be prevented from rotating when the nut 64 is tightly threaded thereon.

Figure 13:
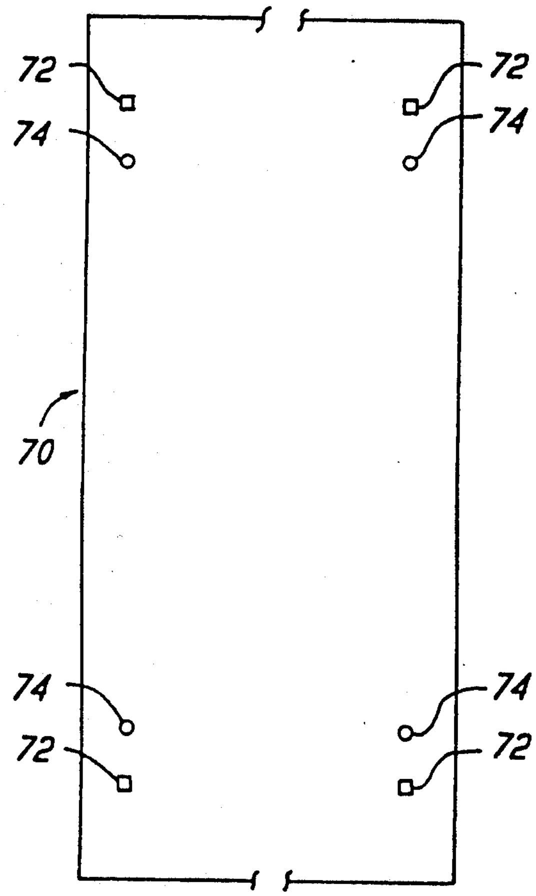
FIG. 13 is an elevation view of a mounting plate according to the present invention.
Figure 14:
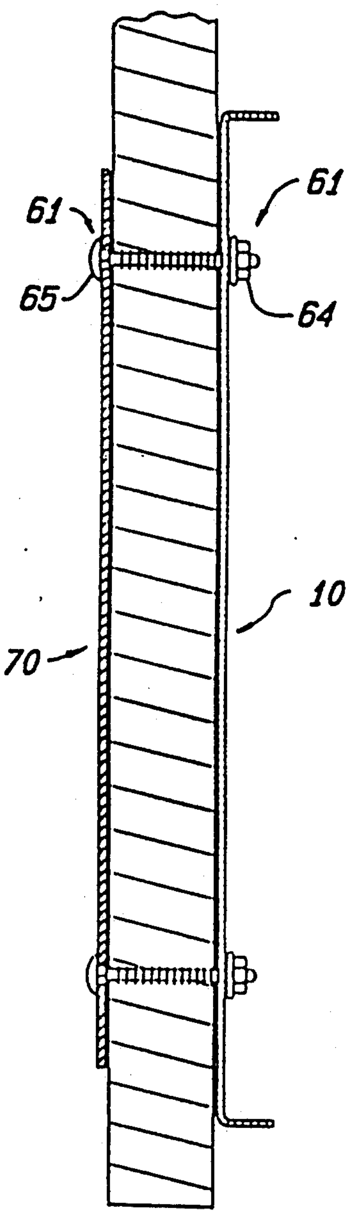
FIG. 14 is a side elevation view showing the use of the brackets of FIG. 13 for mounting the base member of the present invention to a vertical surface.

Referring to FIGS. 13 and 14, there is provided in an alternative method of mounting the base member 10 to a side panel of a desk or a wall, the bolt member 61, the washer 63 and nut 64 of the fastener 60 of FIG. 11 and a generally rectangular plate 70. In the plate 70 there is provided a plurality of non-circular holes 72 and a plurality of holes 74. The holes 72 are used for the same purpose as the hole 67 in the washer 62 of FIG. 11. That is, the holes 72 cooperate with the shoulder 66 on the bolt member 61 to prevent rotation of the bolt member 61 when the nut 64 is threaded thereon. In addition, the plate member 70 distributes the compressive forces imposed by the fasteners 60 over a wider area and therefore are capable of holding vertically mounted equipment in cases where the washer 62 would be inadequate.

Figure 16:
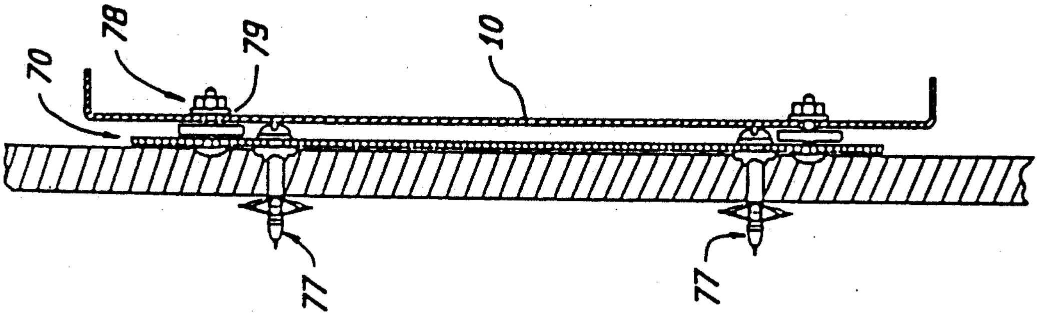
Figure 15:
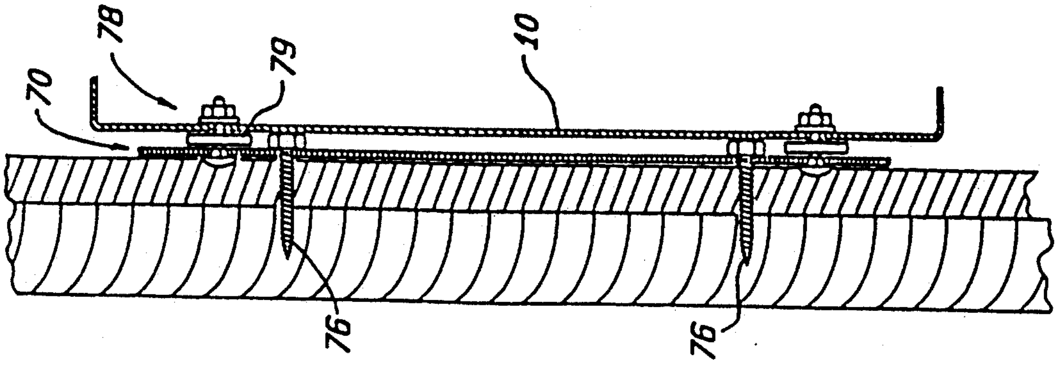

Referring to FIGS. 15 and 16, there are shown two additional embodiments of the present invention wherein the plate member 70 is used for mounting the base member 10 to a vertical wall surface. In the embodiment of FIG. 15, conventional wood screws 76 are passed through the holes 74 for mounting the plate member 70 into a wooden surface, stud, or the like. In the embodiment of FIG. 16, hollow wall anchors 77 are used for attaching the plate member 70 to a surface comprising a sheet of drywall material. In each of the embodiments of FIGS. 15 and 16, the base member 10 is mounted to the plate member 70 by means of a plurality of fasteners 78. The fasteners 78 are substantially identical to the fasteners 60 described above with respect to FIGS. 11 and 12, albeit they are typically shorter. To provide a clearance space between the base member 10 and the plate 70 there is provided a washer 79. The washer 79 provides clearance for the heads of the wood screws 76 and hollow wall anchors 77 in the apparatus of FIGS. 15 and 16, respectively.

The principal advantage of using the plate member 70 in the embodiments of FIGS. 15 and 16 lies in the fact that if the base member 10 must be exchanged for a base member of a different size in order to accommodate different sized equipment, the base member 10 may be removed from the plate member 70 and replaced with the base member of a different size or shape so long as the holes for mounting the base member used to the plate member 70 are 12 inches apart, as described above. In this manner, it is not necessary to create additional holes in the vertical wall members or other surfaces to which the plate member 10 is mounted.

Figure 18:
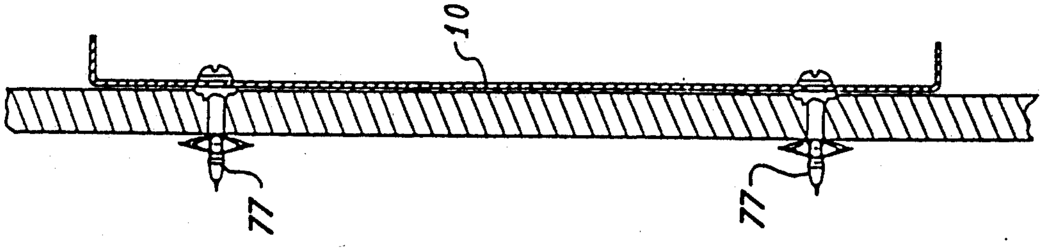
FIGS. 15-18 are cross-sectional views of alternative methods used for mounting the base member according to the present invention to a vertical wall surface.
Figure 17:
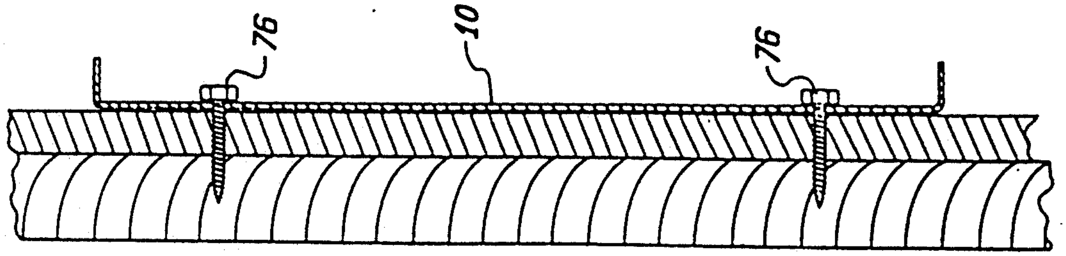

Referring to FIGS. 17 and 18, the base member 10 is shown mounted directly to a vertical wall surface by means of a plurality of wood screws 76 or, in the case of mounting to a drywall, hollow wall anchors, or the like, 77. The base member 10 is mounted directly to the vertical surface in those cases wherein frequent removal or replacement of the base member 10 is not likely.

Referring to FIGS. 19 and 20, there is shown in accordance with the present invention an L-shaped bracket 80 for suspending the base member 10 from the under surface 81 of a desk or table top 82. In the longer leg of the bracket 80 there is provided a plurality of non-circular holes 83 and 84. The holes 83 and 84 correspond to the holes 72 in the bracket 70 of FIG. 13 for mounting the base member 10 to the bracket 80 using a stove-bolt-type fastener 85. Each set of holes 83 and 84 are a predetermined distance apart, e.g. 12 inches. The uppermost set of holes, i.e. holes 84, are used for mounting the base member 10 as close as possible to the undersurface 81 of the top 82. If the base member is too large to be mounted using the holes 84, the lower set of holes 83 may be used. For even larger base members, additional sets of holes may be provided below those shown.

As described above, the non-circular holes, i.e. generally square-shaped holes, prevent rotation of the fastener 85 when a nut 86 is threaded thereon. The shorter leg 87 of the bracket 80 is provided with a plurality of holes 88 which are used in conjunction with a fastener 89 for mounting the bracket 80 to the under surface 81 of a desk or table top 82. In this embodiment of the present invention it is frequently necessary, such as when particle board or the like is used as the top, to use threaded inserts 90 which are inserted in the desk or table top 82 for receiving the fasteners 89.

Figure 21:
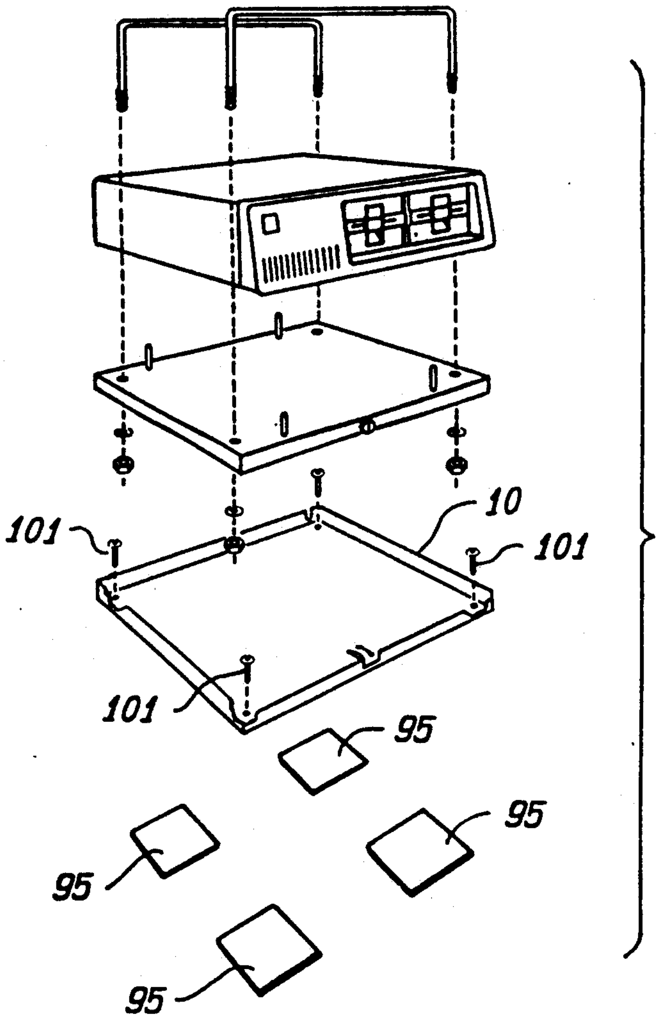
FIG. 21 is an exploded view showing an alternative means for mounting the apparatus of the present invention to a horizontal or a vertical surface using one or more adhesive pads.
Figure 22:
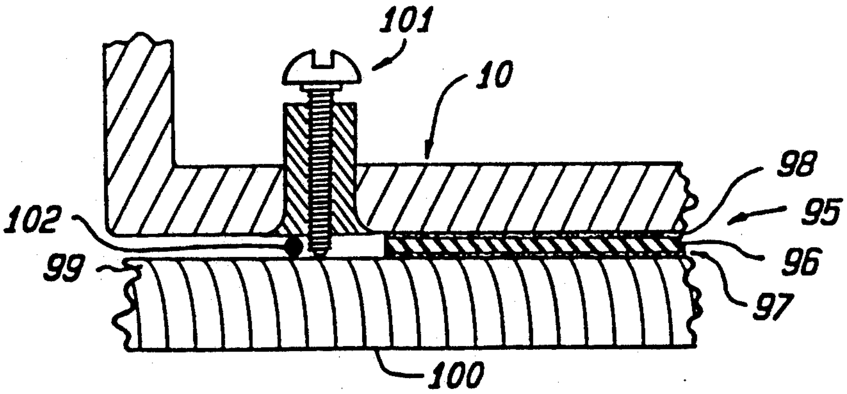
FIG. 22 is an enlarged view of a screw member according to the present invention which is used for preventing the unauthorized cutting of the adhesive pads of FIG. 21.

Referring to FIGS. 21 and 22, there is shown in still another embodiment of the present invention a plurality of adhesive pads 95. The pads 95 typically comprise an open cell foam carrier 96 with adhesive on both sides 97 and 98 for securely attaching the base member 10 to a horizontal surface 99 of a desk or table top 100. In each of the corners of the base member 10, as shown more clearly in FIG. 21, there is provided a threaded screw member 101.

After installation of the base member 10 on the table or desk top 100, the screw members 101 are advanced until they contact the top surface 99 of the desk or table top 100.

Heretofore, thin wires or the like, such as the thin wire 102 shown in cross-section in FIG. 22, have been used for cutting through the adhesive pads in order to separate the base member 10 from the surface to which it has been attached. It will be seen, however, that once the threaded screw members 101 are advanced to contact the upper surface of the desk or table top to which the base member 10 is attached, it is no longer possible to pass a wire 102, or the like, between the base member 10 and the surface to which it is attached.

While several preferred embodiments of the present invention are described above, it is contemplated that various modifications may be made thereto without departing from the spirit and scope of the present invention. Accordingly, it is intended that the embodiments described be considered only as illustrative of the present invention and that the scope thereof should not be limited thereto but be determined by reference to the claims hereinafter provided and their equivalents.

What is claimed is:

1. Equipment security apparatus for securing equipment to a horizontal or vertical surface comprising:

a base member;

a cover member;

an elongated, continuous, relatively narrow, U-shaped, equipment retaining member, said retaining member having an intermediate portion which is provided to extend over the top of said equipment and a leg member which extends orthogonally from each end of said intermediate portion and down each side of said equipment, the lower ends of said leg members being provided to extend through holes provided therefor in said cover member and said intermediate portion and said leg members having a substantially uniform cross-section;

means for engaging the ends of each of said leg members which extend through the holes provided therefor in said cover member so as to prevent the withdrawal of said leg members from said holes until said engaging means is removed from said ends;

means which extends upwardly from said cover member to engage an outside edge of said equipment for preventing movement of said equipment from beneath said U-shaped retaining member;

means for attaching said base member to one of said horizontal or vertical surfaces; and means located in said base and cover members for releasably locking said cover member to said base member.

2. Equipment security apparatus according to claim 1 wherein each of the legs of said U-shaped retaining member comprises threads and said engaging means comprises a nut adapted to be threaded onto said legs.

3. Equipment security apparatus according to claim 2 wherein said U-shaped retaining member comprises case-hardened steel.

4. Equipment security apparatus according to claim 1 wherein said movement preventing means comprises at least two pin members each of which extends upwardly from said cover member along the rear edge of said equipment and along the front edge of said equipment, respectively.

5. Equipment security apparatus according to claim 4 wherein said pin members comprise steel.

6. Equipment security apparatus according to claim 1 wherein said cover member comprises a downwardly extending front and rear wall and a plurality of spaced rod-like stud members projecting inwardly from said rear wall of said cover member and said base member comprises an upwardly extending front and rear wall with a hole corresponding to each of said stud members located in said rear wall of said base member for receiving said stud members.

7. Equipment security apparatus according to claim 1 wherein said U-shaped retaining member comprises a U-shaped rod-like member having a circular cross-section.

8. Equipment security apparatus according to claim 1 wherein said U-shaped retaining member comprises a strap-like member having a rectangular cross-section.

9. Equipment security apparatus according to claim 1 wherein said movement preventing means comprises at least one pin member which extends upwardly from said cover member along at least one of the front and rear edges of said equipment.

10. Equipment security apparatus according to claim 1 wherein said locking means comprises:

a lock member receiving means located inwardly of one of said front walls of said base and cover members; and lock means located in the other of said front walls of said base and cover members, said lock means having a movable member which when rotated from an open position to a closed position engages said lock member receiving means for releasably locking said cover member to said base member.

11. Equipment security apparatus according to claim 10 wherein said lock member receiving means comprises a loop and said movable member in said lock means comprises a finger for engaging said loop.

12. Equipment security apparatus according to claim 11 wherein said lock means comprises a pick-resistant-type lock means.

13. Equipment security apparatus according to claim 1 wherein said one of said horizontal or vertical surfaces comprises a substantially planar surface and wherein said means for attaching said base member to one of said horizontal or vertical surfaces comprises a plurality of fastening means, each of which is adapted to be inserted through said planar surface and holes provided therefor in said base member, each of said fastening means comprising a stove-bolt-type head on the exposed end thereof, a nut member on the base member end thereof and a means having a non-circular hole therein for preventing rotation of said fastening means when said nut member is threaded thereon.

14. Equipment security apparatus according to claim 13 wherein said means having a non-circular hole therein for preventing rotation of said fastening means comprises a washer-like member, said washer-like member comprising a square-shaped hole therein for receiving a corresponding square-shaped shoulder which extends from said stove-bolt-type head and a plurality of teeth members which are adapted to engage said wall-like member for preventing rotation of said washer-like member.

15. Equipment security apparatus according to claim 13 wherein said means having a non-circular hole therein for preventing rotation of said fastening means comprises a generally rectangular plate member.

16. Equipment security apparatus according to claim 1 wherein said one of said horizontal or vertical surfaces comprises a substantially planar surface and said means for attaching said base member to one of said horizontal or vertical surfaces comprises:

a generally rectangular plate member having a first plurality of holes and a second plurality of non-circular holes;

a first plurality of fastening means adapted to be inserted through said first plurality of holes in said plate member for attaching said plate member to said planar member;

a second plurality of fastening means adapted to be inserted through said second plurality of non-circular holes in said plate member and corresponding holes in said base member for attaching said base member to said plate member, each of said second plurality of fastening means comprising a stove-bolt-type head on the plate end thereof, a non-circular shoulder which extends from said stove-bolt-type head which is adapted to be inserted in a corresponding one of said non-circular holes in said plate member for preventing rotation of said fastening means when a nut member is threaded thereon.

17. Equipment security apparatus according to claim 16 wherein said first plurality of fastening means comprises conventional wood screws.

18. Equipment security apparatus according to claim 16 wherein said first plurality of fastening means comprises conventional drywall fastening means.

19. Equipment security apparatus according to claim 1 wherein said one of said horizontal or vertical surfaces comprises a substantially planar surface and said means for attaching said base member to one of said horizontal or vertical surfaces comprises a plurality of wood screw-like members which are adapted to be inserted through holes provided therefor in said base member and into said planar surface.

20. Equipment security apparatus according to claim 1 wherein said one of said horizontal or vertical surfaces comprises a substantially planar surface and said means for attaching said base member to one of said horizontal or vertical surfaces comprises a plurality of drywall type fastening means which are adapted to be inserted through holes provided therefor in said base member and said planar surface.

21. Equipment security apparatus according to claim 1 wherein said one of said horizontal or vertical surfaces comprises a substantially planar surface and said means for attaching said base member to one of said horizontal or vertical surfaces comprises an adhesive pad for attaching said base member to said planar surface.

22. Equipment security apparatus according to claim 21 wherein said adhesive pad has a holding strength in tension of at least 80 psi.

23. Equipment security apparatus according to claim 21 comprising means located in each of the corners of said base member for preventing the insertion of a means for cutting said adhesive pad between said base member and said planar surface.

24. Equipment security apparatus according to claim 23 wherein said preventing means comprises screw means which is adapted to be moved into contact with said planar surface.

25. Equipment security apparatus according to claim 1 comprising means for coupling additional equipment to said base and cover members for preventing an unauthorized removal of said additional equipment from said base and cover members.

26. Equipment security apparatus according to claim 25 wherein said base and cover members comprise overlapping slots for receiving the end of a cable means and said coupling means comprises a cable means having an end thereof located in said slots, said cable means having a first end fitted with a first fitting for preventing the withdrawal of said cable means from said slots and a second end fitted with a second fitting for coupling said cable means to said additional equipment.

27. Equipment security apparatus according to claim 26 wherein one of said first and said second fittings comprises a ball-shaped fitting and the other of said first and said second fittings comprises a fitting having a generally rectangular hole therein.

28. Equipment security apparatus according to claim 1 wherein said one of said horizontal or vertical surfaces comprises a downwardly facing planar surface and said means for attaching said base member to one of said horizontal or vertical surfaces comprises:

a generally rectangular L-shaped bracket;

first means for attaching the shorter leg of said L-shaped bracket to said downwardly facing planar surface; and a plurality of second means for attaching said base member to said bracket.

29. Equipment security apparatus according to claim 28 wherein said bracket comprises a plurality of sets of non-circular holes in the longer leg thereof, the holes in each of said sets being an equal distance apart, and each of said second attaching means comprises a stove-bolt-type head and a non-circular shoulder which extends therefrom which is adapted to be inserted in one of said non-circular holes for preventing rotation thereof when a nut is threaded thereon.

* * * * *